United States Patent [19]

Grabb

[11] 4,013,819
[45] Mar. 22, 1977

[54] HANDLE CONSTRUCTION FOR BATTERIES

[75] Inventor: Nicholas G. Grabb, Scarborough, Canada

[73] Assignee: Varta Batteries Limited, Willowdale, Canada

[22] Filed: Aug. 27, 1975

[21] Appl. No.: 608,141

[52] U.S. Cl. .............................. 429/187; 224/45 F
[51] Int. Cl.[2] ...................................... H01M 2/10
[58] Field of Search .......... 136/166, 181; 224/45 F; 429/187

[56] References Cited

UNITED STATES PATENTS

| | | | |
|---|---|---|---|
| 3,092,520 | 6/1963 | Buskirk et al. | 136/181 |
| 3,797,876 | 3/1974 | Gummelt | 224/45 F |

FOREIGN PATENTS OR APPLICATIONS

| | | | |
|---|---|---|---|
| 869,329 | 5/1961 | United Kingdom | 136/166 |

*Primary Examiner*—Donald L. Walton

[57] ABSTRACT

A rope holder for a battery handle rope is integral with a side of the battery case. The holder has two separate laterally spaced-apart sets of first and second passageways, the bottom opening of each passageway being unobstructed. Each passageway receives and permits passage therethrough of a length of battery handle rope having a rigid elongate lug on each end thereof. The area beneath the bottom opening of each passageway is sufficiently unobstructed to permit threading of the battery handle rope through the first and second passageways. The rigid elongate lug of the rope is secured in the upper portion of the second passageway. Upon failure of the means for securing the lug, the lug is frictionally bound in the lower portion of the second passageway because the cross-sectional area of the second passageway is less than the longitudinal length of the rigid lug. The battery handle rope is retained in the battery holder even with failure of the means for securing the lug.

12 Claims, 4 Drawing Figures

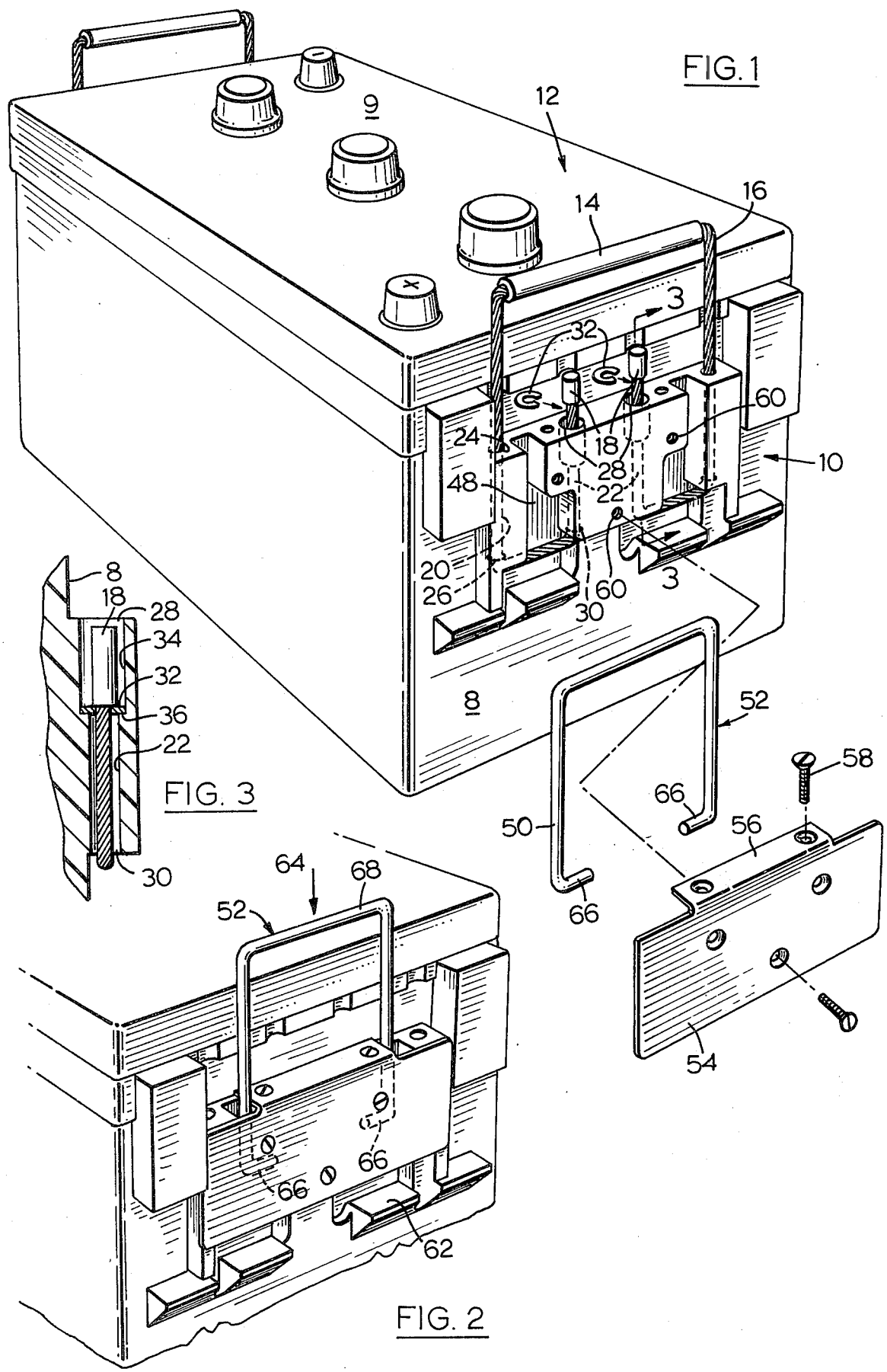

HANDLE CONSTRUCTION FOR BATTERIES

FIELD OF INVENTION

This invention relates to battery rope holders and more particularly, to a battery rope holder which has a built-in safety feature of retaining the battery rope in the holder upon failure of the means for securing the rope in the holder.

BACKGROUND OF THE INVENTION

Carrying handles for batteries of weights ranging from 30 lbs. on up to 200 lbs. or more are necessary to facilitate handling of the battery by one or more persons. Metal bale handles for batteries are adequate for such purposes although they have the drawback of setting up a secondary electrolytic cell on the battery which results in corrosion of the metal handle. Plastic battery handle ropes may be used with a rope holder on a battery. However, with the prior art type of battery handle rope holders, special tools are required to replace a broken plastic rope in the field. The prior art type of rope holders also lack a safety feature of retaining the rope in the holder should the primary means for securing the rope in the holder fail.

It is therefore an object of the invention to provide a rope holder for a battery which is integrally molded with the side of the battery case and which facilitates replacement of the battery handle rope in the field.

It is a further object of the invention to provide a rope holder which has a safety feature of retaining the rope in the holder upon failure of the primary means for securing the battery rope in the holder.

It is another object of the invention to provide a rope holder and battery rope combination which may be used on very heavy batteries weighing in the order of 40 to 200 lbs or more.

It is yet another object of the invention to provide a rope holder for a battery which may be adapted to accommodate a metal bale handle for the battery.

It is a further object of the invention to provide a rope holder construction which frictionally binds a lug on a battery rope in a passageway of the rope holder when the primary means for securing the rope in the holder fails.

BRIEF SUMMARY OF THE INVENTION

The rope holder according to this invention for battery handle rope may be integrally molded with the side of a battery case, such as the hard rubber and other types of plastic battery cases. The holder comprises a body portion which has two separate laterally spaced-apart sets of first and second passageways. Each passageway has a top and bottom opening. The first and second passageways are spaced apart with the bottom opening of each passageway being unobstructed. Each passageway is adapted to receive and permit passage therethrough of a length of battery handle rope where such rope has a rigid elongate lug on each end thereof. The area beneath the bottom opening of each passageway is sufficiently unobstructed to permit the removal of a rigid elongate lug on a length of the battery handle rope from the bottom of the first passageway and permit insertion of the same elongate lug in the bottom of the second passageway when an end of a battery handle rope is threaded through a set of said first and second passageways. Means is provided for securing the rigid elongate lug in the upper portion of the second passageway.

The location of the bottom of the first passageway relative to the bottom of the second passageway is such that a turning moment is exerted on the longitudinal axis of a rigid elongate lug by a battery handle rope being under tension, as the lug is about to be withdrawn from the bottom of the second passageway. The second passageway has a cross-sectional area at the lower portion thereof which is adapted to cause such lug to frictionally bind therein when a turning moment is exerted on such lug. When a means for securing the lug in a second passageway is accidentally released or fails, and the battery handle rope is under tension, the elongate rigid lug of the battery handle rope frictionally binds in the lower portion of the second passageway as the turning moment is exerted on such lug when it is about to be withdrawn from the second passageway by the tension in the rope. As a result, the battery handle rope is retained in the rope holder to prevent dropping of the battery to guard the person carrying the battery against injury and also to prevent hazardous spilling of acid contained in the battery.

If, while the battery is used in the field, the battery handle rope is severed, a new battery rope may be inserted in the holder without requiring special tools. The replacement rope may be easily threaded through the passageways of the rope holder and secured therein by an appropriate locking means.

DESCRIPTION OF THE DRAWINGS

These and other objects, advantages and features of the invention will become more apparent in the following detailed description of the preferred embodiments of the invention as shown in the drawings, wherein:

FIG. 1 is a perspective view showing a rope holder integrally molded to a side of the battery case according to a preferred embodiment of the invention.

FIG. 2 shows the rope holder of FIG. 1 with the metal bale handle assembled.

FIG. 3 shows a section along line 3—3 of FIG. 1.

DETAILED DESCRIPTION OF THE PREFERRED EMBODIMENTS

Figure 4:
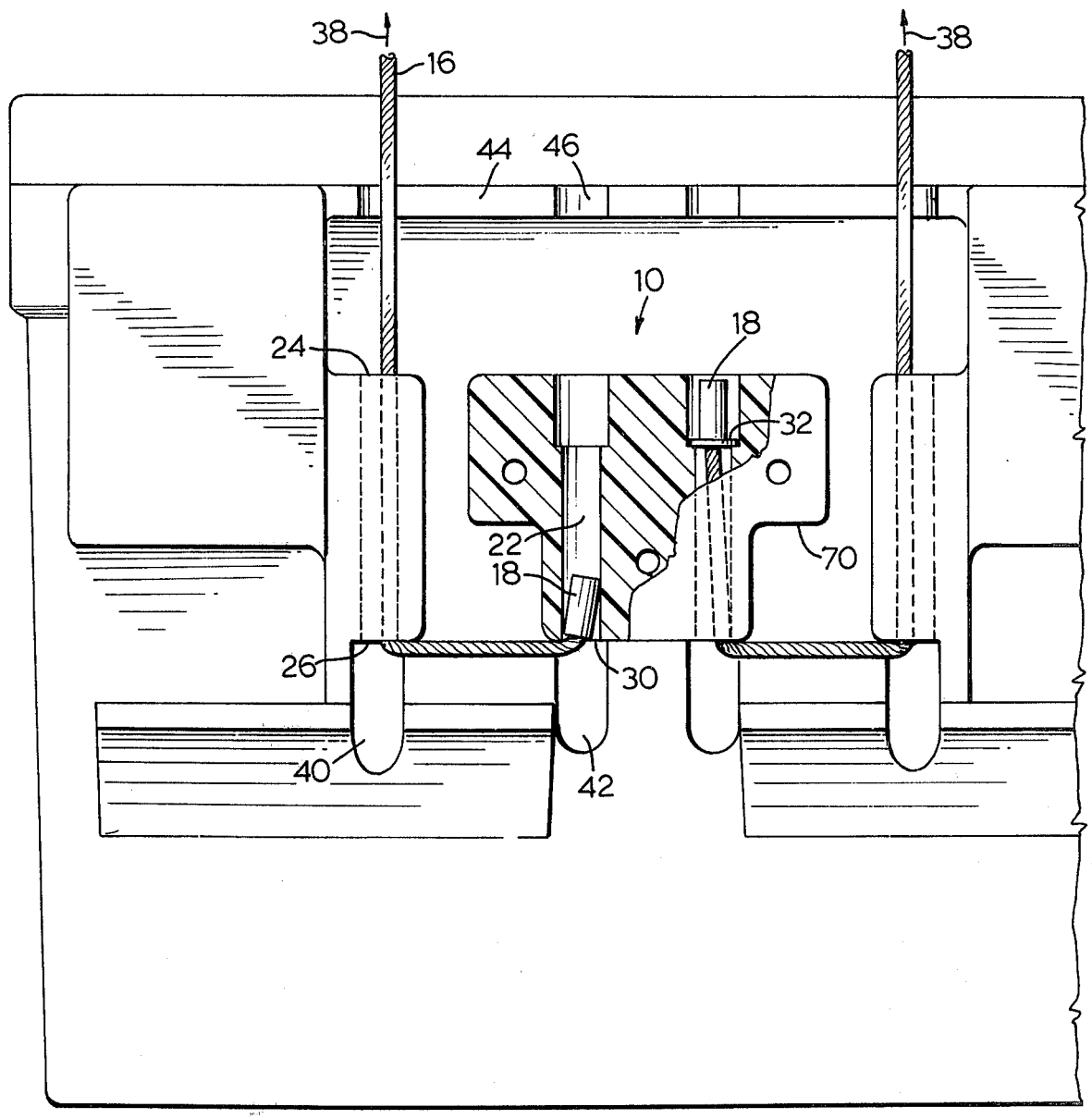
FIG. 4 is an end view of the rope holder of FIG. 1 where the means for securing the battery rope in the holder has failed and the lug of the rope is frictionally bound in the passageway of the holder.

A molded battery case is shown in FIG. 1 having a rope holder 10 integrally molded with a side thereof. A rope holder 10 holds a battery handle rope 12 having a grip portion 14 and a continuous length of rope 16. The rope is preferably made of an acid corrosion resistant plastic material. Preferred plastic ropes are braided polypropylene and polyethylene, although unbraided ropes and plastic covered ropes may also be used. The grip portion 14 is preferably plastic material and may be an extruded tube of polypropylene. The length of battery handle rope has at each end thereof a rigid elongate lug 18 which is cylindrical in shape.

The battery holder 10 has a body portion integrally molded with the side of the battery 8. In the body portion there are two separate laterally spaced-apart sets of first and second passageways. The first passageway 20 and the second passageway 22 are shown in dotted lines in the body portion of FIG. 1. The passageways may be bored by a drill to provide cylindrical bores.

The first set of passageways 20 and 22 is on the left of the drawing and the second set of passageways 20 and 22 is on the right. The first passageway 20 has a top opening 24 and a bottom opening 26. Similarly, the second passageway has a top opening 28 and a bottom opening 30. Bottom openings 26 and 30 of the first and second passageways are unobstructed. The area beneath the bottom openings 26 and 30 is sufficiently unobstructed to permit threading of an end of the battery handle rope having lug 18 down through first passageway 20 and up through second passageway 22. As more clearly shown in FIG. 3, the diameter of the bore of the second passageway 22 is greater than the diameter of cylindrical lug 18 to permit passage of lug 18 therethrough.

After the threading of an end of the battery rope handle through the first and second passageways of the holder to the position shown in FIG. 1, a split retaining washer 32 is placed over rope 16 underneath lug 18. The second passageway 22, as more clearly shown in FIG. 3, is provided with an enlarged bore 34 which presents a shoulder 36. The split washer 32 rests on shoulder 36 and retains lug 18 in enlarged bore 34 thereby securing that portion of the battery handle rope in the holder. Similarly, for the second set of passageways of the holder, the battery handle rope is threaded therethrough and secured therein.

Referring to FIG. 4, a situation is shown where retaining ring 32 has failed in the first set of first and second passageways. As the battery is lifted, tension in the direction of arrows 38 is applied to the rope 16 by the weight of the battery. Because the second passageway 22 is of a diameter larger than the diameter of lug 18, rope 16 is pulled through the second passageway until lug 18 is about to be withdrawn from the lower portion of it. The bottom 26 of the first passageway is at the same level as the bottom 30 of the second passageway.

As the lug 18 is about to emerge from the bottom opening 30, a portion of the battery rope 16a exerts a turning moment on the longitudinal axis of the lug 18 to cause it to turn in the passageway 22. The diameter of the passageway 22 is less than the longitudinal length of the lug 18 so that the turning of the lug 18 is hindered by passageway 22. As a result, the lug 18 is frictionally bound in passageway 22 in the position shown in FIG. 4. With this safety feature, failure of a retaining ring or the absence of a retaining ring does not result in a dropping of the battery. Instead, the battery may drop a slight amount due to the movement of the lug 18 down passageway 22, but no further, so that the person lifting the battery is not injured and is able to continue lifting and moving the battery around with the battery handle rope retained in the holder in the manner shown in FIG. 4.

It will be understood that the cross-sectional shape of the first and second passageways may be rectangular or some other polygonal shape where the lug has a cross-sectional dimension such that it fits within the passageway. For example, the passageway may be cylindrical shaped and the lug 18 rectangular in cross-section where the dimensions of the lower portion of the second passageway and the lug provide the requisite binding of the lug in the bottom of the second passageway.

The positioning of the bottom of the first passageway relative to the second passageway may be varied from that shown in FIG. 4. For example, the bottom of the first passageway may be above the second passageway. In addition, the first and second passageways need not be parallel to each other. The passageways may even intersect one another at the bottom part of the holder. A further alternative is that the bottom of the first passageway may be located below the bottom of the second passageway providing there is sufficient frictional binding force created between the lug and the second passgeway when it is withdrawn from it. It is understood that when the bottom of the first passageway is below the bottom of the second passageway, a downward component of force will be exerted on the lug. The downward component of force must never exceed the frictional binding force between the lug and the second passageway.

To facilitate threading of the end of the battery handle rope through the first and second passageways, recesses 40 and 42 are provided below the first and second passageways. These recesses accommodate the lug 18 so that the lug may be withdrawn from and directly inserted into the respective passageways.

As previously discussed, the body portion 19 of the rope holder may be adapted to receive a metal bale handle. As shown in FIG. 1, the body portion 10 has L-shaped recesses 48 formed therein. The L-shaped recesses 48 receive the L-shaped portions 50 of bale handle 52. The bale handle 52 is held in the L-shaped recesses 48 by a metal plate 54 having an inturned lip 56. Screws 58 secure the plate 54 to the body portion 10 by threading into the respective threaded holes 60. As shown in FIG. 2, the bale handle 52 is assembled to the battery sides with all the screws 58 in place. Ledges 62 are provided on the side of the battery so that when the bale handle is pushed down in the direction of arrow 62, the bottom portions 66 of the metal bale handle rest on ledges 62. In such position, the upper portion 68 of the bale handle is below the upper surface 9 of the battery. As more clearly shown in FIG. 4, the ledge 70 in each L-shaped recess 48 abuts the L-shaped legs of metal bale handle 52 when the handle is in the raised position as shown in FIG. 2, the plate 54 retaining the handle in place so as to ensure that the battery is not dropped when the handle is in use.

It is understood that when it is not desired to provide the option of a metal bale handle, the L-shaped recesses 48 may be eliminated and the recess filled in, providing that the bottom openings of passageways 20 and 22 remain unobstructed to permit threadng of the rope handle through the passageways.

Although various preferred embodiments of the invention have been described herein in detail, it will be understood by those skilled in the art that variations may be made thereto without departing from the spirit of the invention or the scope of the appended claims.

The embodiment of the invention in which an exclusive property or privilege is claimed are defined as follows:

1. A battery handle rope and rope holder combination comprising a length of rope having at each end thereof a rigid elongate lug, and a rope holder body portion integrally molded with a side of a battery case, said rope holder body portion comprising two separate laterally spaced apart sets of first and second passageways, each passageway having a top and a bottom opening, said first and second passageways being spaced apart with the bottom opening of each passageway being unobstructed, each passageway being adapted to receive and permit passage therethrough of said length of rope and said lugs, the area beneath the bottom opening of each passageway being sufficiently unobstructed to permit removal of said rigid elongate lug from the bottom opening of said first passageway and permit insertion of the same lug into the bottom of said second passageway when an end of said battery handle rope is threaded through a set of said first and second passageways, means for securing said rigid elongate lugs in the upper portion of said second passageway, the location of the bottom opening of said first passageway relative to the bottom opening of said second passageway being such that a turning moment is exerted on the longitudinal axis of said rigid elongate lug by said battery handle rope being under tension as said lug is about to be withdrawn from the bottom of said second passageway, said second passageway having a cross-sectional area at the lower portion thereof which is adapted to cause such lug to frictionally bind therein when such a turning moment is exerted on said lug, and when said means for securing said elongate lug in second passageway is accidentally released and said battery handle rope is under tension, said elongate rigid lug frictionally binds in the lower portion of said second passageway as a turning moment is exerted on said lug as it is about to be withdrawn from the bottom of said second passageway by the tension in said rope so that said battery handle rope is retained in said rope holder.

2. A battery handle rope and rope holder combination of claim 1 wherein the bottom opening of said first passageway is at the same level as the bottom opening of said second passageway.

3. A battery handle rope and rope holder combination of claim 1 wherein the bottom of said first passageway is positioned higher than the bottom of said second passageway.

4. A battery handle rope and rope holder combination of claim 1 wherein said first and second passageways of each said set are parallel to the spaced apart from each other.

5. A battery handle rope and rope holder combination of claim 1 wherein said first and second passageways are positioned at an angle relative to each other.

6. A battery handle rope and rope holder combination of claim 1 wherein the upper portion of each second passageway has a shoulder, said means for securing said lug being a split washer which is located beneath said lug and which is adapted to rest on said shoulder to thereby retain said lug in the upper portion of said second passageway.

7. A battery handle rope and rope holder combination of claim 1 wherein said first and second passageways are cylindrical shaped bores.

8. A battery handle rop and rope holder combination of claim 7 wherein said rigid elongate lugs are cylindrical in shape, the diameter of the lower portion of said second passageway being less than the length of the longitudinal axis of said lug.

9. A battery handle rope and rope holder combination of claim 7 wherein said rigid elongate lugs are cylindrical in shape, the diameter of the lower portion of said second passageway being less than the diagonal length defined between two diametrically opposed extremities of said lug.

10. A battery handle rope and rope holder combination of claim 1 wherein said rope is plastic.

11. A battery handle rope and rope holder combination of claim 10 wherein said rope has a tubular shaped moveable handle portion.

12. A battery handle rope and rope holder combination of claim 10 wherein said plastic is selected from the group of plastics consisting of polypropylene and polyethylene.

* * * * *